United States Patent [19]

Fluckiger et al.

[11] 4,161,207

[45] Jul. 17, 1979

[54] PRODUCTION OF CARBIDE LADEN CONSUMABLES IN A GRAPHITE MOLD

[75] Inventors: Jean L. Fluckiger, Sao Paulo, Brazil; René Wasserman, Echichens, Switzerland

[73] Assignee: Eutectic Corporation, Flushing, N.Y.

[21] Appl. No.: 870,767

[22] Filed: Jan. 19, 1978

Related U.S. Application Data

[63] Continuation of Ser. No. 690,921, May 28, 1976, abandoned.

[51] Int. Cl.² .................... B22D 23/06; B22D 25/00
[52] U.S. Cl. ........................................ 164/80; 164/97; 428/627; 219/146.31
[58] Field of Search .............. 164/80, 91, 97, 136; 228/903; 219/145, 146; 428/627, 628

[56] References Cited

U.S. PATENT DOCUMENTS

| | | | |
|---|---|---|---|
| 1,910,884 | 5/1933 | Comstock | 164/80 X |
| 1,977,128 | 10/1934 | Hawkins | 219/145 |
| 2,002,462 | 5/1935 | Woods | 219/145 X |
| 2,137,471 | 11/1938 | Zublin | 219/145 |
| 3,028,644 | 4/1962 | Waldrop | 164/97 |
| 3,109,917 | 11/1963 | Schmidt et al. | 219/145 X |
| 3,458,685 | 7/1969 | Tezuka et al. | 219/146 |
| 3,523,569 | 8/1970 | Quaas | 228/903 X |
| 3,627,979 | 12/1971 | Quaas | 219/146 |

*Primary Examiner*—Othell M. Simpson
*Assistant Examiner*—Gus T. Hampilos
*Attorney, Agent, or Firm*—Hopgood, Calimafde, Kalil, Blaustein and Lieberman

[57] ABSTRACT

A carbide laden consumable is produced using a mold having at least one U-shaped groove running along the surface thereof, the consumable being produced by charging a first layer of a powdered self-fluxing alloy into the groove, a second layer of a powdered refractory carbide on said first layer and a third layer of said self-fluxing alloy on the carbide layer, and the charged mold then passed through a heating furnace under a reducing atmosphere to produce by melting and cooling a consumable of markedly improved quality.

7 Claims, 8 Drawing Figures

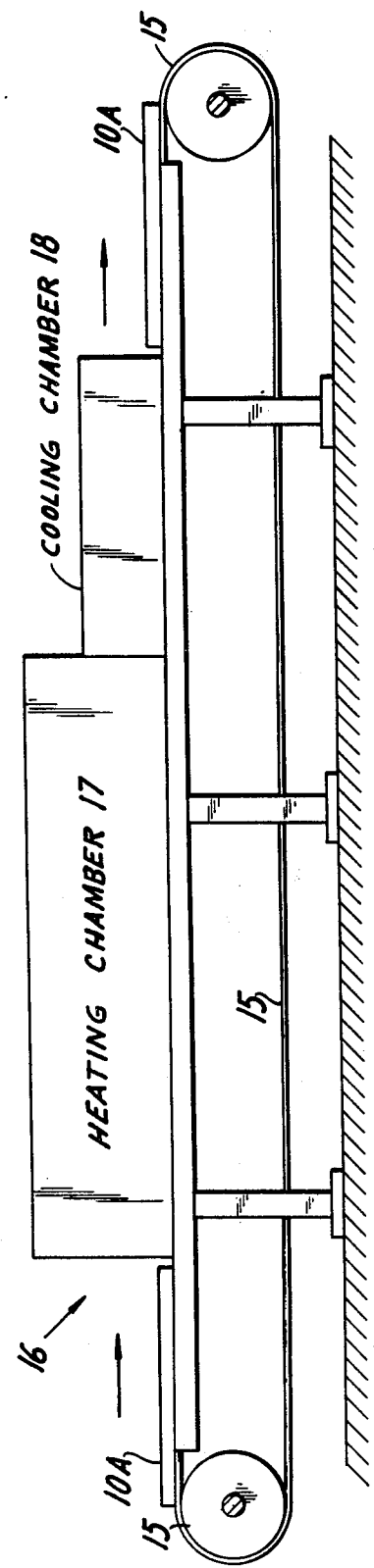
FIG. 8
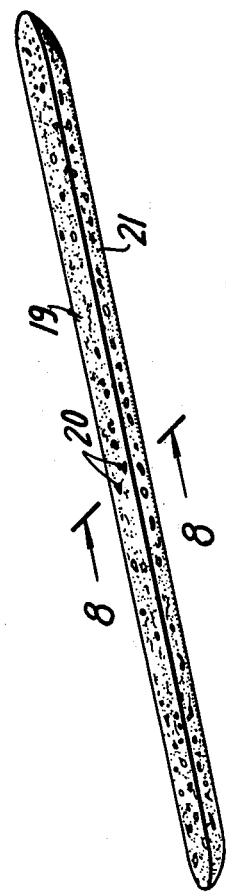
FIG. 7
FIG. 6

PRODUCTION OF CARBIDE LADEN CONSUMABLES IN A GRAPHITE MOLD

This is a continuation of copending application Ser. No. 690,921 filed May 28, 1976, now abandoned.

This invention relates to a method for producing carbide laden consumables of improved quality in the form of composite rods comprising particles of refractory carbide, such as tungsten carbide, distributed through a matrix of a self-fluxing alloy.

STATE OF THE ART

Refractory carbides of various particle sizes are used as additives to certain alloys for use in producing hard face coatings on metal substrates which in use are subjected to wear and abrasion. Such hard face coatings may be used to provide cutting edges, or the consumable may be employed in the mining or oil industries for applying the refractory carbide-matrix alloy composite structure to parent materials, for example, rotary cutting bits, fishing tools, and other working parts. Generally speaking, the cutting and/or wear and abrasion surfaces produced by these refractory carbides find use in equipment used for drilling, boring, reaming, earth removing, burning shoes, core tools, bucket teeth for excavation equipment, and the like.

It would be desirable to have a consumable which has good quality as to cleanliness and which can be handled fairly roughly in the field without breaking easily. One method for producing a composite rod comprised of carbides distributed through a matrix alloy is disclosed in U.S. Pat. No. 3,523,569 dated Aug. 11, 1970. In this patent, the composite rods are produced by distributing loose particles of a refractory carbide linearly along a holding surface, e.g. along the internal V-groove of an angle iron, and then applying a molten self-fluxing matrix alloy over the refractory carbide layer by successive passes thereover with a flame torch, the spraying being continued until substantially all of the carbide particles are surrounded and at least partially embedded in the matrix alloy.

While the foregoing method was particularly applicable to the production in the field of carbide-containing consumables, the rods produced had to be handled with care to avoid breakage during use. Apparently, in producing the rods by the foregoing method using a flame torch for applying the matrix metal, the material tended to oxidize, due to the fact that a slightly oxidizing flame was employed. Moreover, the composite rods produced did not always exhibit a uniform distribution of the carbide in the matrix alloy which is desirable.

OBJECTS OF THE INVENTION

It is thus an object of the invention to provide a method for producing a carbide-containing consumable of high quality.

Another object is to provide a carbide-containing consumable in the form of a composite rod of high quality.

These and other objects will more clearly appear from the following disclosure and the accompanying drawing, wherein:

FIG. 6 is a schematic of a furnace with a heating chamber and a cooling chamber through which the charged mold is passed; and FIGS. 7 and 8 depict a composite rod produced in accordance with the invention.

STATEMENT OF THE INVENTION

Figure 1:
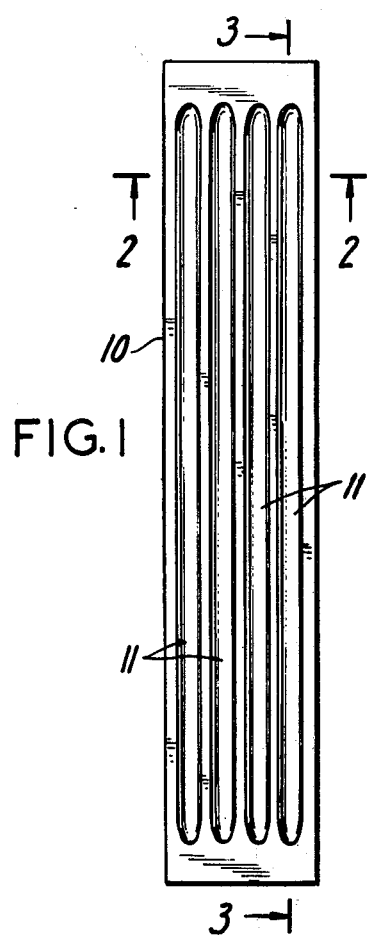
FIGS. 1, 2 and 3 depict one embodiment of a graphite mold which may be employed in producing carbide-containing consumables in the form of composite rods in accordance with the invention.

One embodiment of the invention is directed to a method of producing a carbide laden consumable in the form of a rod comprising, providing a graphite mold having at least one elongated U-shaped groove therein containing a charge of fusible ingredients comprising a first layer of powdered self-fluxing matrix metal alloy at the bottom of the groove, a second layer of particulate metal carbide on top of said first layer and a third layer of said matrix metal alloy on top of the second layer. The composition of the matrix metal alloy and the refractory carbide taken together as charged in the mold ranges by weight from about 80% to 30% of the metal alloy and 20% to 70% of the refractory metal carbide. The self-fluxing matrix metal alloy employed is selected from the group consisting of Ni-base, Ni-Cu-base, Fe-base and Co-base alloys containing by weight at least one element selected from the group consisting of about 0.1% up to 6% silicon (e.g. at least about 0.5%) and about 0.1% to 5% boron (e.g. at least 0.5%) having a melting point ranging up to about 1370° C., the refractory metal carbide being selected from the group consisting of carbides of W, Mo, Cr, Zr, Ti, Hf, Nb, Ta, V, B and Si and mixtures of at least two of said carbides. The self-fluxing alloy also includes nickel silver alloys.

The mold is then passed through a furnace maintained at a temperature above the melting point of the matrix alloy, the furnace atmosphere being reducing and preferably comprising a hydrogen-containing atmosphere. Following melting and infiltration of the matrix alloy into the interstices of the carbide layer, the mold enters a cooling zone where the melted matrix alloy is immediately solidified.

It is preferred that the mold be charged with the powdered ingredients in the manner described hereinabove. For example, if the refractory carbide particles are placed at the bottom of the U-shaped groove as similar to the method described in U.S. Pat. No. 3,523,569, and the matrix metal powder then placed on top of the carbide particles and the charged mold passed through a furnace on a conveyor, the composite rod produced will tend to have a bend in it, for example, a one and one-half inch bend for an 18 inch rod.

On the other hand, if the charge is prepared by placing a portion of the self-fluxing matrix metal powder at the bottom of the U-shaped groove, the carbide particles on top and the carbide particles in turn covered by the remaining self-fluxing matrix metal powder, and the charge then melted by passing the mold through a conveyor furnace, a straight composite rod is obtained of improved strength and high quality as evidenced by a good clean composite structure.

DETAILS OF THE INVENTION

As stated earlier, a horizontal graphite mold is used with U-shaped grooves machined into the surface of the mold. A mold made of amorphous graphite has been found very satisfactory. An advantage of using the graphite mold is that it is a good conductor of heat. Being a black body, it absorbs heat quickly as it passes through the heating zone of the furnace whereby the charge is melted, the molten self-fluxing alloy penetrating the layer of refractory carbide via the interstices between the particles from below and above said carbide layer by which capillary and gravity flow. Since the melting of the self-fluxing alloy is fast and efficient, segregation of the carbide particles is substantially inhibited, the molten alloy penetrating the spaces between the carbide particles to form a substantially uniform structure. Thus, when the charged mold following melting soon after reaches the cooling zone, the molten matrix alloy immediately solidifies to provide a good clean composite rod of high quality in which the carbide particles are strongly anchored.

For the self-fluxing alloys referred to, the melting temperature may range up to about 1370° C. and generally from about 900° C. to 1250° C. (e.g. about 900° C. to 1150° C.).

A reducing atmosphere is employed, the furnace preferably having a flame curtain at the inlet end and one at the outlet end to prevent as much as possible air from bleeding into the furnace.

Preferably, the reducing atmosphere in the furnace is a hydrogen-containing atmosphere, for example, hydrogen mixed with a substantially inert gas, such as nitrogen. Thus, the atmosphere may contain about 10% to 75% by volume of hydrogen and the balance nitrogen. Cracked ammonia is particularly preferred containing about 25% $N_2$ and 75% $H_2$ by volume.

By using a hydrogen-containing atmosphere, such as cracked ammonia, no fluxing is necessary during the melting of the matrix metal and, moreover, hydrogen reduces any oxides in the powder. Because the atmosphere is inherently deoxidizing, the metal powder is cleaned up during melting and good sound composite rods are produced of high quality. In the case where the matrix metal is a nickel silver alloy, the hydrogen prevents the oxidation of the zinc, which is important since zinc oxide tends to be volatile.

The more detail aspects of the invention will be clearly apparent by referring to the drawing and, in particular, FIGS. 1 to 4 which illustrate a typical embodiment of a graphite mold having utility in carrying out the invention.

Figure 4:
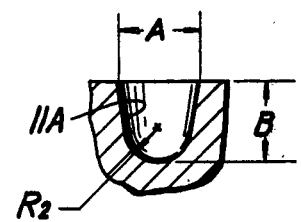
FIG. 4 is a fragment of a cross section showing a U-shaped groove in which the consumable is produced by melting a powdered charge of the ingredients making up the consumable.

Thus, referring to FIG. 1, a mold 10 of amorphous graphite is shown in plan view which may be about 95 to 97 millimeters (mm) wide (approximately 3.8 inches), about 506 to 508 mm long (approximately 20 inches long) and about 25 to 30 mm thick (approximately 1.1 inches), the mold having 4 U-shaped grooves 11 therein which may be 456 to 458 mm long (approximately 18 inches). Referring to FIG. 4, the dimensions of the U-shaped groove 11A are shown by the letters "A" (width) and "B" (depth). In keeping with the dimensions stated hereinabove, the width and depth may be 14 and 14 mm (approximately 0.55 inch). The term "U-shaped groove" is meant to cover V-shapes and variations thereof.

Smaller sized grooves may be employed as follows in producing composite rods of about 18 inches long, with the width "A" and depth "B" of the U-shaped grooves being as follows:

|     | A    | B    |
| --- | ---- | ---- |
| (1) | 3 mm | 3 mm |
| (2) | 5    | 5    |
| (3) | 7    | 7    |

Figure 3:
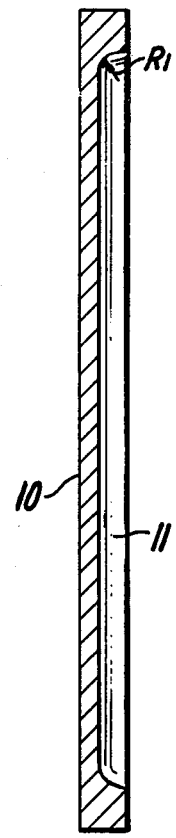

The ends of the groove in FIG. 3 are provided with a radius $R_1$, e.g. 15 mm, the bottom of the U-shaped groove having a radius $R_2$. Where the width and depth of the grooves are 14×14 mm, the radius $R_2$ may be 15 mm.

As stated hereinbefore, in charging the grooves in the mold with the particulate ingredients (not FIG. 5), it is preferred that the ingredients be stratified so that in effect three layers are used, a first layer 12 of self-fluxing matrix metal on the bottom, a second layer 13 of particulate refractory carbide on top of the first layer, and a third layer 14 of the remaining self-fluxing alloy on top of the refractory carbide layer.

It is preferred, however, that the U-shaped grooves be first provided with a mold wash to assure long life of the mold and to enable easy releasing of the cast composite rod from the mold. Fine pure aluminum oxide is preferred, although other refractory oxide mold washes can be employed, such as $SiO_2$, MgO, CaO and the like. The mold wash material should be less than 200 mesh and at least 75% less than 325 mesh. Precipitated aluminum oxide of particle size less than 1.0 micron is preferred. A slurry of the oxide is produced in water and applied to the mold in several steps with drying in between until the desired coating has been obtained.

Figure 5:
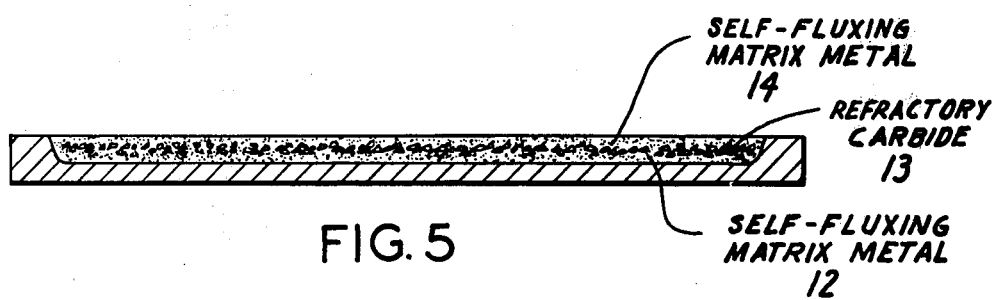
FIG. 5 is a longitudinal cross section of a graphite mold of the type shown in FIG. 1 showing the specially arranged powdered charge employed in producing a high quality composite rod.

Following application of the aluminum wash to the grooves in the mold, the grooves are charged with the particulate ingredients as shown in FIG. 5 and the mold 10A placed on a conveyor 15 and passed through the heating chamber 17 of furnace 16, the matrix metal caused to melt in the heating zone or chamber 17 following which the mold 10A enters the cooling zone or chamber 18 where it reaches substantially ambient temperature and the mold 10A unloaded as it exits from the cooling chamber.

The furnace is preferably electrically heated, the cooling chamber being water cooled via heat exchanger tubes through which water is continuously passed.

A typical composite rod 19 is shown in FIG. 7, a cross section thereof being shown in FIG. 8 comprising refractory carbide particles 20 of, for example, tungsten carbide, distributed through the self-fluxing matrix metal alloy 21.

As stated hereinabove, a wide variety of self-fluxing alloy compositions may be employed, such as Ni-base, Ni-Cu-base, Co-base, and Fe-base alloys and certain of the nickel silver alloys, so long as the alloys contain at least one of the elements selected from the group consisting of by weight about 0.1% to 6% silicon and about 0.1% to 5% boron. Typical refractory carbides which may be employed include WC, MoC, $Cr_7C_3$, ZrC, TiC, HfC, NbC, TaC, VC, $B_4C$, SiC, among others. The term "refractory carbide" is meant to include the foregoing and other refractory carbides. The carbides may be used alone or in combination of two or more.

The foregoing self-fluxing alloys have good wetting properties and penetrate the layer of carbide easily.

The compositions of such alloys are selected to provide a melting point not exceeding about 1370° C., and preferably falling within the range of about 900° C. to 1250° C., e.g. 900° C. to 1150° C.

An alloy matrix containing predominately a metal of the iron-cobalt-nickel group has been found useful according to this invention. A suitable example of this type of base alloy is as follows:

| NICKEL-BASE MATRIX ALLOY | | |
|---|---|---|
| Constituent | Range in Percent by Weight | Example |
| Silicon | 1.5–5.0 | 3.0 |
| Boron | 1.5–5.0 | 2.0 |
| Chromium | 0–20 | 1.0 |
| Molybdenum | 0–7 | 0.2 |
| Nickel | (1) | (1) |

(1) Essentially the Balance

The above alloy may be substituted in nickel content by cobalt or iron. The following matrix alloy is illustrative of cobalt-base compositions found useful.

| COBALT-BASE MATRIX ALLOY | | |
|---|---|---|
| Constituent | Range in Percent by Weight | Example |
| Nickel | 1.0–5.0 | 3.0 |
| Chromium | 26.0–32.0 | 28.0 |
| Silicon | 0.5–3.0 | 1.0 |
| Boron | 1.0–3.0 | 2.0 |
| Carbon | 0.8–2.0 | 1.0 |
| Tungsten | 3.5–7.5 | 4.5 |
| Molybdenum | 0.0–0.5 | 3.0 |
| Cobalt | (1) | 57.5 |

(1) Essentially the Balance

Again, nickel or iron may be substituted in the above formulation for a like amount of cobalt. The iron alloy is harder and more resistant than the other but is more subject to corrosion and oxidation during deposition.

A particularly preferred nickel-copper-base matrix alloy containing no zinc which has been found useful has the following constituents in percentages by weight as indicated:

| NICKEL-COPPER-BASE ALLOY | | |
|---|---|---|
| Constituent | Broad Range | Intermediate Range |
| Nickel | (1) | (1) |
| Silicon | 1.0–5.0 | 3.0–4.0 |
| Boron | 0.15–2.50 | 0.25–0.5 |
| Manganese | 0.20–2.00 | 0.5–1.0 |
| Copper | 15.0–40.0 | 20.0–28.0 |

(1) Essentially the Balance

As an example of a matrix alloy within the above ranges, there may be mentioned:

| Constituents | Percent by Weight |
|---|---|
| Nickel | 23.00 |
| Silicon | 3.45 |
| Boron | 0.47 |
| Manganese | 0.75 |
| Copper | (1) |

(1) Essentially the Balance

As stated hereinbefore, nickel silver is particularly desirable as a matrix alloy and may range broadly in composition by weight from about 2% to 20% nickel, 28% to 58% zinc, 0.1% to 1.0% silicon, 0.0 to 1.0% silver and the balance essentially copper (e.g. about 40% to 65%).

The above illustrated iron, cobalt, copper-nickel-base and nickel silver alloys are particularly useful because they melt at relatively low temperatures. Thus, by using these low temperature matrix alloys, the heat initially used in the melting of the alloys is low and the individual particles are not subject to contact with extremely high heat. Additionally, these compositions firmly bind the carbide particles to the parent material following brazing. When the composite rod is ultimately deposited, a hard, shockproof surface is provided and the particles are not easily dislodged.

The foregoing self-fluxing matrix alloys are sometimes referred to as follows: NiCrSiB, NiSiB, CoCrSiB, CoSiB, FeCrSiB, etc.

The final composite rod may range in composition from about 20% to 70% by weight of refractory carbide and 80% to 30% by weight of matrix metal. Preferably, the refractory carbide may range from about 45% to 55% and the matrix metal from about 55% to 45% by weight.

In producing the layered charge, between about 25% to 50% by weight of the total weight of the self-fluxing matrix metal powder is preferably placed as the first layer in the mold, with all of the particulate carbide placed on the first layer and the remainder of 75% to 50% of the total matrix metal added as the third layer.

The particle size of the matrix metal alloy may range up to about 80 mesh in size (e.g., up to 50% below 325 mesh and ranging up to about 200 mesh). The size of the particulate refractory carbide may range from about 5 microns to as high as ¾ inch (19 mm) e.g., plus 60 mesh to ⅜ inch (about 10 mm). Where coarse carbides are employed, the cross sectional dimensions of the rod should be sufficient to anchor at least one-half the average thickness of the particles.

As illustrative of the various embodiments of the invention, the following examples are given.

EXAMPLE 1

Figure 2:

A mold of the type shown in FIGS. 1 to 3 having U-shaped grooves therein with a cross section of about 14 mm × 14 mm and approximately 456 to 458 mm long (about 18 inches) is coated with an alumina mold wash. The mold is then charged with the ingredients to provide a composition containing 50% by weight of tungsten carbide of particle size of about plus 100 mesh (U.S. Standard) to one-eighth size and 50% by weight of a nickel-base matrix alloy of minus 100 mesh containing by weight 3% silicon, 2% boron, 1% chromium, 0.2% molybdenum and the balance essentially nickel.

About 40% by weight of the total matrix alloy powder is placed at the bottom of the grooves, followed by a layer of tungsten carbide and the remaining matrix alloy powder (60% by weight of the total matrix metal) placed on top of the carbide layer.

The graphite mold with the charge is placed on a conveyor made of a heat resistant alloy (e.g. an alloy containing about 15% Cr, 7% iron and the balance essentially nickel and known in the trade by the designation Inconel) and passed through the furnace (FIG. 6) into a heating chamber 17 maintained at a temperature (e.g. 1250° C.) above the melting point of the matrix alloy using cracked ammonia as the atmosphere. The speed of the conveyor is such that the mold is in the heating chamber for about one hour. The nickel-base alloy below and above the carbide layer melts and flows into the interstices of the carbide layer by both capillary and gravity flow.

The mold with the fused contents (mold 10A) then enters the cooling chamber 18 where the matrix alloy is substantially immediately solidified and provides uniform distribution of the carbide in the matrix. The mold exits from the cooling chamber as shown in FIG. 6 through a protective curtain of burning natural gas to provide a straight composite rod of high quality and good strength.

EXAMPLE 2

A composite rod may be formulated using the method similar to Example 1, except that the carbide material is TiC with a particle size ranging from about −60 mesh to plus 100 mesh, the matrix alloy being a self-fluxing cobalt-base alloy containing 3% Ni, 28% Cr, 1% Si, 1% B, 4.5% W, 3% Mo, 57.5% Co and the balance residuals.

Half of the matrix metal powder of particle size substantially between 325 mesh and 200 mesh is placed in the bottom of U-shaped grooves having cross sectional dimensions of about 7 mm wide by 7 mm deep, the grooves being about 457 mm long (about 18 inches).

The carbide and matrix metal are proportioned together to provide a composite rod containing about 30% by weight TiC and 70% by weight of the matrix metal. The charged graphite mold with a previously applied mold wash coating is passed through the furnace as in Example 1 using an atmosphere of cracked ammonia, the temperature of the heating chamber being at about 1250° C., that is, above the melting point of the self-fluxing cobalt-base matrix alloy. When the mold reaches the cooling chamber, the fused matrix alloy is rapidly cooled to provide a clean straight composite rod of good strength.

EXAMPLE 3

Another formulation which may be produced using the method of the invention comprises a commposition containing about 60% by weight NbC of particle size ranging from plus 60 mesh to one-eighth inch and balance a self-fluxing nickel-copper-base matrix metal containing about 23% Ni, 3.45% Si, 0.47% B, 0.75% Mn and the balance essentially copper, the matrix metal having a particle size with up to 25% passing through 325 mesh screen and ranging up to about 200 mesh.

As in example 2, half of the matrix powder is placed in the bottom of the U-shaped grooves of the mold having cross sectional dimensions of about 10 mm wide by 10 mm deep and about 457 mm long (about 18 inches).

The composite rod may be produced as in Example 2, to produce a clean rod of good quality and strength.

Examples of other composite formulations for use in producing composite rods in accordance with the inventon are as follows:

| Carbide | % Weight | MATRIX METAL | % Wt |
|---|---|---|---|
| SiC | 20 | 3% Ni, 2% B, 1% Cr, 0.2% Mo and balance Ni | 80 |
| Sintered WC Fragments | 60 | 48% Cu, 10.5% Ni, 0.5% Si, 0.05% P, 0.3% Ag and balance Zn | 40 |
| Cr7C3 | 45 | 0.7% C, 15% Cr, 4% Si, 3.2% B, 4% Fe and balance | 55 |

-continued

| Carbide | % Weight | MATRIX METAL | % Wt |
|---|---|---|---|
| | | Ni | |

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of producing a carbide laden consumable in the form of a composite rod which comprises,
   providing a graphite mold having at least one elongated U-shaped groove therein,
   said at least one groove containing a charge of fusible ingredients comprising a first layer of powdered self-fluxing matrix metal alloy at the bottom of said groove, a second layer of particulate refractory metal carbide on top of said first layer and a third layer of said matrix metal alloy on top of said second layer, said first layer of said powdered matrix metal constituting about 25% to 50% of the total combined first and third layers, with the third layer making up the balance of the total combined first and third layers.
   the composition of said matrix metal alloy and said refractory carbide together in said mold ranging by weight from about 80% to 30% of said matrix metal alloy and the balance consisting essentially of about 20% to 70% of said refractory metal carbide,
   said self-fluxing matrix metal alloy being selected from the group consisting of Ni-base, Ni-Cu-base, Fe-base and Co-base alloys containing by weight at least one element selected from the group consisting of about 0.1% to 6% of silicon and about 0.1% to 5% boron and having a melting point ranging up to about 1370° C.,
   said refractory metal carbide being selected from the group consisting of carbides of W, Mo, Cr, Zr, Ti, Hf, Nb, Ta, V, B and Si and mixtures of at least two of said carbides,
   passing said graphite mold through a furnace having a heating zone maintained at a temperature above the melting point of said matrix alloy,
   said furnace having a cooling zone immediately after said heating zone, the atmosphere in said furnace being reducing,
   causing said matrix alloy to melt and infiltrate the interstices in said carbide layer,
   and passing said graphite mold into said cooling zone immediately after said heating zone to solidify said matrix alloy and inhibit segregation of said refractory carbide to thereby produce a composite rod characterized by improved quality and improved strength.

2. A method of producing a carbide laden consumable in the form of a composite rod which comprises,
   providing a graphite mold having at least one elongated U-shaped groove therein,
   said at least one groove containing a charge of fusible ingredients comprising a first layer of powdered self-fluxing matrix metal alloy at the bottom of said groove, a second layer of particulate refractory metal carbide on top of said first layer and a third layer of said matrix metal alloy on top of said second layer, said first layer of said powdered matrix metal constituting about 25% to 50% of the total combined first and third layers, with the third layer making up the balance of the total combined first and third layers, the composition of said matrix metal alloy and said refractory carbide together in said mold ranging by weight from about 80% to 30% of said matrix metal alloy and the balance consisting essentially of about 20% to 70% of said refractory metal carbide, said self-fluxing alloy being selected from the group consisting of:

(A) nickel-base matrix alloy containing about 1.5% to 5% Si, about 1.5% to 5% boron, up to about 20% chromium, up to about 7% molybdenum and the balance essentially nickel;

(B) cobalt-base matrix alloys containing about 1% to 5% nickel, about 26% to 32% chromium, about 0.5% to 3% silicon, about 1% to 3% boron, about 0.8 to 2% carbon, about 3.5% to 7.5% tungsten, up to about 0.5% molybdenum and the balance essentially cobalt;

(C) nickel-copper-base matrix alloys containing about 1% to 5% silicon, about 0.15% to 2.5% boron, about 0.2% to 2% manganese, about 15% to 40% copper and the balance essentially nickel; and (D) nickel silver matrix alloys containing about 2% to 20% nickel, about 28% to 58% zinc, 0.1% to 1% silicon, up to 1% silver and essentially the balance ranging from about 40% to 65% copper, said matrix alloy having a melting point ranging up to about 1370° F., said refractory carbide being selected from the group consisting of W, Mo, Cr, Zr, Ti, Hf, Nb, Ta, V, B and Si and mixtures of at least two of said carbides, passing said graphite mold on a conveyor through a furnace having a heating zone maintained at a temperature above the melting point of said matrix alloy, said furnace having a cooling zone immediately after said heating zone, the atmosphere in said furnace being reducing, causing said matrix alloy to melt and infiltrate the interstices in said carbide layer from said first and third layers, said passing said graphite mold into said cooling zone immediately after said heating zone to solidify said matrix alloy and inhibit segregation of said refractory carbide to thereby produce a composite rod characterized by improved quality and improved strength.

3. The method of claim 2, wherein the reducing atmosphere is a hydrogen-containing atmosphere.

4. The method of claim 3, wherein the hydrogen-containing atmosphere comprises 10% to 70% by volume of hydrogen and the balance an inert atmosphere.

5. The method of claim 4, wherein the hydrogen-containing atmosphere is cracked ammonia.

6. The method of claim 3, wherein the powdered matrix metal alloy has a particle size less than about 200 mesh with up to 50% by weight less than 325 mesh, and wherein the powdered refractory metal carbide has a particle size ranging from about 5 microns to ¾ inch.

7. The method of claim 6, wherein the refractory carbide is tungsten carbide of particle size of plus 60 mesh to ¾ of an inch.

* * * * *